L. E. WOODWARD.
Plow.
No. 212,295.  Patented Feb. 11, 1879.
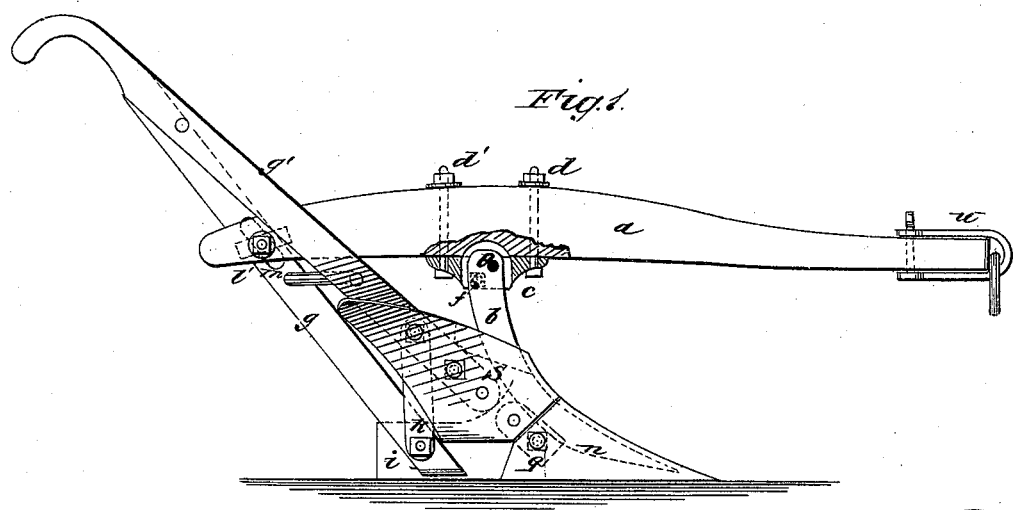
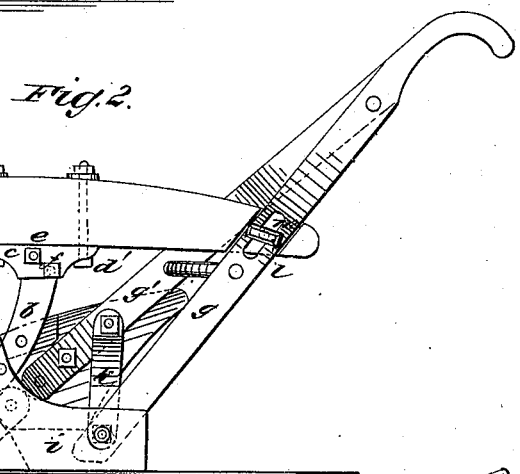
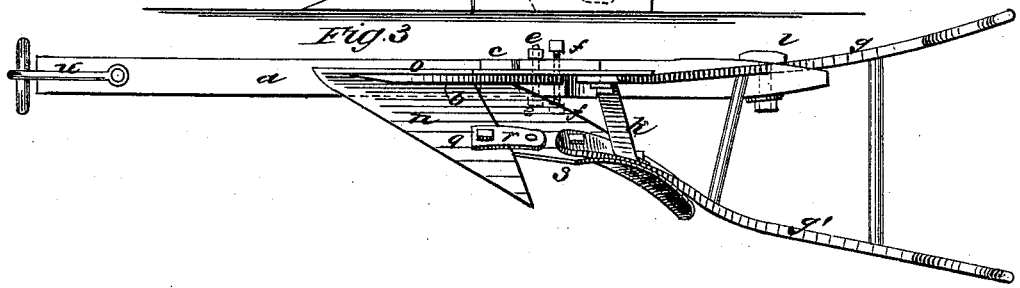
WITNESSES:
INVENTOR:
L. E. Woodward
BY Munn & Co
ATTORNEYS.

UNITED STATES PATENT OFFICE.

LEWIS E. WOODWARD, OF WACO, TEXAS.

IMPROVEMENT IN PLOWS.

Specification forming part of Letters Patent No. 212,295, dated February 11, 1879; application filed September 25, 1878.

*To all whom it may concern:*

Be it known that I, LEWIS ETHREDG WOODWARD, of Waco, in the county of McLennan and State of Texas, have invented a new and Improved Plow, of which the following is a specification:

The object of my invention is to furnish a plow adapted for heavy or wet lands, and which may be adjusted for depth and width of furrow without changing the clevis or harness.

In the accompanying drawings, Figure 1 is a side elevation of my improved plow at the mold-board side. Fig. 2 is an elevation at the opposite or land side; and Fig. 3 is an inverted plan view.

Similar letters of reference indicate corresponding parts.

$a$ is the beam; $b$, the standard, connected at its upper end to a bracket, $c$, that is connected firmly at the under side of beam by bolts $d\ d'$. The bracket $c$ is slotted, and the end of standard $b$ is held in the slot by a cross-bolt, $e$.

$f f$ are set-screws, passing through the side of bracket $c$ and bearing upon the standard $b$, to retain it in position. The bracket $c$ is slotted transversely where the bolt $d'$ passes through, to permit lateral adjustment of that end of bracket $c$.

$g\ g'$ are the handles, the lower ends of which are connected to the plow by bolts, the handle $g$ to the wing $i$, and the handle $g'$ to the mold-board, $s$.

$k$ is a brace from one handle to the other, connected by the same bolts which connect the handles to the plow. The beam $a$ extends to the rear, contiguous to handle $g$, and is connected therewith by a T-headed bolt, $l$, which passes through beam $a$, and through a slot, $m$, in handle $g$.

$n$ is the plow-point, and $o$ the share, formed in one piece with the point $n$. The share $o$ is connected by a bolt, $p$, with the forward-projecting end of the standard $b$, and the point $n$ is connected by a bolt, $q$, to a strap, $r$, that is riveted to the mold-board $s$, and connects the point $n$ and mold-board $s$ firmly together on that side. Only the two bolts mentioned are required to connect the point and share to the plow, and they are so far up that they do not clog by contact with the ground.

The point $n$ is made longer than usual, and comprises nearly one-half of the surface at either side of the plow, and it cuts and lifts the furrow without downward pressure by the mold-board. The mold-board $s$ is carried up high enough and shaped so as to prevent loose dirt from falling over to the left. The point is of such a shape that it commences to raise the land as soon as it cuts and turns the furrow partially, causing the plow to run lighter and rendering it especially available for heavy land.

The beam may be adjusted for depth and width of furrow by means of the connections before described by loosening the set-screws $f$ and the bolt $l$. The standard $b$ can be swung on its pivot, and the point may be shifted to right and left by loosening the bolt $d'$. No change in the harness or clevis is required, and an ordinary clevis, such as shown at $u$, may be used, so that the draft will come in the center line of the beam at all times.

Having thus described my invention, I claim as new and desire to secure by Letters Patent—

The combination of the slotted bracket $c$, hinged standard $b$, and set-screws $f f$ with the beam $a$ and slotted handle $g$, arranged for vertical and lateral deflection of the plow-beam, substantially as and for the purpose specified.

LEWIS ETHREDG WOODWARD.

Witnesses:
 EPHRAIM VAUGHN LUNSFORD,
 W. A. HENRY.